Nov. 26, 1940.   J. H. THOMPSON   2,223,051
VARIABLE SPEED DEVICE
Filed June 13, 1939
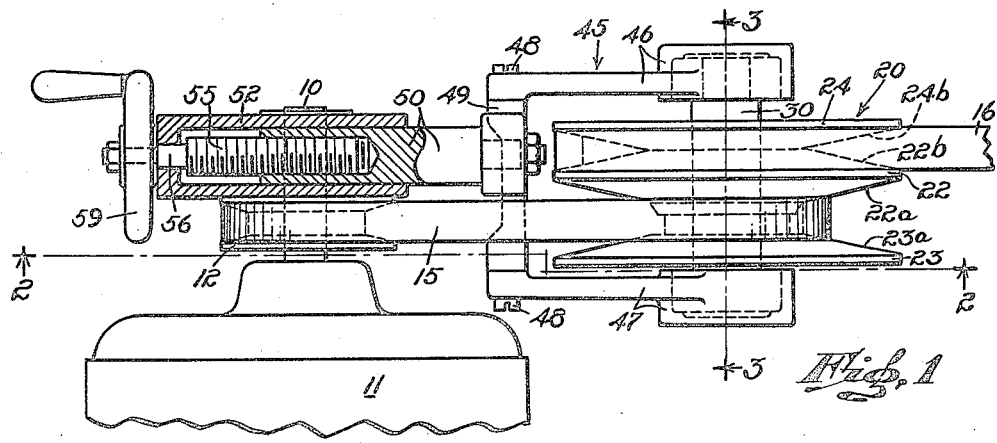
Fig. 1
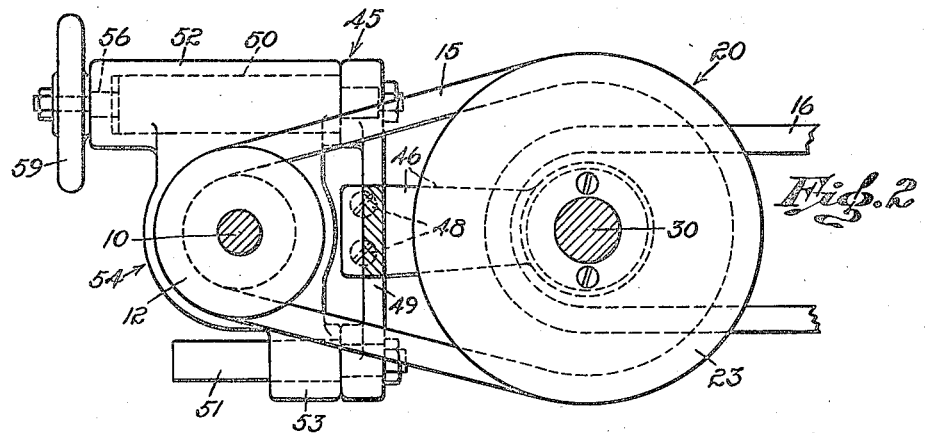
Fig. 2
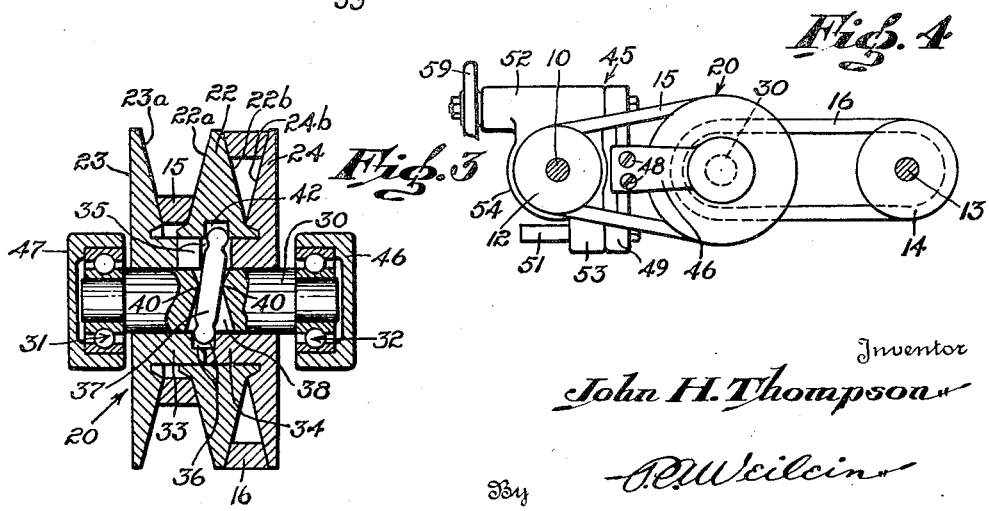
Fig. 3
Fig. 4
Inventor
John H. Thompson
By
[attorney signature]
Attorney Patented Nov. 26, 1940

2,223,051

UNITED STATES PATENT OFFICE 2,223,051

VARIABLE SPEED DEVICE

John H. Thompson, Glendale, Calif.

Application June 13, 1939, Serial No. 278,901

9 Claims. (Cl. 74—230.17)

This invention relates to variable speed devices, and more particularly to devices of the type employing expansible pulleys and belts engageable with the pulley faces at various effective diameters to alter the transmission ratio.

It is an object of the present invention to provide an improved mechanism for varying the effective belt contacting diameters of an expansible pulley transmission.

Another object of the invention is to provide a compact and sturdy expansible pulley variable speed device capable of infinite variation in the transmission ratio between wide limits.

A further object of the invention is to provide a variable speed expansible pulley transmission embodying a self-contained, automatic belt tightening arrangement of parts.

Still a further object of the invention is to incorporate an automatic belt tightener in a variable speed transmission having intermediate expansible pulleys for altering the transmission ratio between driving and driven instrumentalities.

Another object of the invention is to automatically tension the belts cooperable with expansible pulleys in dependence upon the load being transmitted.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined in the appended claims.

Referring to the drawing:

Figure 1 is a top plan view, partly in section, of a variable speed device embodying the present invention, with the parts in one position of adjustment.

Figure 2 is a view taken as indicated by line 2—2 of Figure 1, with the parts shown in another position of adjustment.

Figure 3 is a transverse section taken as indicated by line 3—3 of Figure 1; and Figure 4 is a diagrammatic view disclosing the relationship between the intermediate pulley device and the driving and driven pulleys.

The variable speed device is designed to provide an infinite variation within definite limits between the relative speeds of a driving shaft and a driven shaft. The driving shaft 10 shown in the drawing extends from a prime mover, such as an electric motor 11, and has a V-pulley 12 suitably secured thereto. The driven shaft 13 (Figure 4) also has a driven V-pulley 14 fixed thereto, motion between the two pulleys being conveyed by suitable belts 15 and 16 and a cooperable intermediate expansible pulley device, generally designated 20, the shifting of this latter device being instrumental in altering the transmission ratio. More specifically, in the ratio varying mechanism the driving V-belt 15 contacts the driving pulley 12 and opposed conical faces 22a and 23a on pulley sections 22 and 23 forming part of the intermediate expansible pulley device, these sections being movable axially relative to each other to provide an expansible pulley for varying the radius of contact of the belt therewith. The inner pulley section 22 has another conical face 22b and cooperatively forms a second expansible pulley with an outer pulley section 24 having an opposed conical face 24b. These latter pulley sections are also movable axially with respect to each other to alter the effective contacting diameters of their cone faces with the belt 16 engaging the driven pulley 14.

Although various types of intermediate expansible pulley devices can be employed, in the particular transmission shown in the drawing, I have disclosed an arrangement described and claimed in my copending application entitled Variable speed device, Serial Number 251,552, filed January 18, 1939. This intermediate device 20 includes an intermediate shaft 30 rotatable in anti-friction roller bearings 31 and 32 supported by elements later to be described. The end pulley sections 23 and 24 are attached to one another for unitary motion by suitably securing their inwardly extending hubs 33 and 34 together. A guide slot 35 and a recess 36 are formed in adjacent hub portions. The slot 35 permits passage of a lever 37 extending through an aligned guide slot 38 in the intermediate shaft 30, with the lever being fulcrumed on the knife edges 40 formed in the sides of this slot. One end of the lever 37 is received within the hub recesses 36, while the other end seats within recesses 42 formed in the inner pulley member 22.

The inner pulley member 22 is slidable axially on the connected hubs 33 and 34 to vary the effective contacting diameters between the driving and driven belts 15 and 16 and their respective associated pulley sections 22—23 and 22—24. As explained in the above identified patent application, the lever 37 serves to slidably spline the various pulley sections to the intermediate shaft 30 and positively causes movement of the end sections 23 and 24 in opposite directions with respect to the intermediate section 22 upon alteration in the distances between the axis of the intermediate pulley device 20 and the respective axes of the driving and driven shafts 10 and 13.

The present invention contemplates an improved device for varying the aforementioned axial distances. The intermediate shaft 30 and its bearings 31 and 32 are mounted within a carrier 45 having a pair of spaced arms 46 and 47 receiving the latter elements. These arms are secured by screws or bolts 48 to a cross member 49 from which extends a pair of rods 50 and 51 slideable within the respective guides 52 and 53 fixed to a hub 54 pivotally mounted on the drive shaft 10 adjacent the driving pulley 12. Adjustment of the axis of the intermediate pulley device 20 with respect to the axes of the driving and driven shafts 10 and 13 is obtained by internally threading the rod 50 to receive a companion adjusting screw 55 having a shaft portion 56 rotatably mounted in and extending through an outer end portion of the guide 52. A hand wheel 59 or other instrumentality is fixed to the outer end of this shaft, through the use of which the adjusting screw 55 is rotatable in either direction to shift the slideable carrier parts and correspondingly move the axis of the intermediate shaft 30 and its associated pulley sections closer to or further from the axis of the driving shaft 10. In this manner, the tension on either the driving or driven belts 15, 16 will effect a shifting of the parts of the intermediate pulley device, to inversely alter the effective belt contacting diameters of the two pulleys comprising said intermediate device, in view of the positive interconnection between the sections afforded by the lever arrangement, explained in detail in my prior filed application.

As aforementioned, the carrier 45 is pivotally mounted upon the driving shaft 10, which provides a floating support for the intermediate pulley device 20, permitting it to fulcrum about the driving shaft axis and automatically maintain the driving and driven belts 15 and 16 in properly tightened contact with their cooperative pulley conical faces. As will be seen from Figure 4, variations in the load being transmitted, and consequently the belt tension, will produce a tendency for the intermediate pulley device 20 to pivot about the driving shaft 10 in one direction or the other. Should the load increase, for example, the axial distance between the intermediate shaft 30 and the driven shaft 13 will tend to increase, due to the confined arcuate path traversed by the first-mentioned shaft, tightening the driven belt 16 and urging it toward a smaller radial position of contact with the intermediate pulley 22—24, and consequently, wedging it more firmly into engagement therewith. This wedging tendency not only effects a tightening of the driven belt 16 but tends to force the intermediate pulley section 22 and the outer section 23 toward each other, urging the driving belt outwardly along the expansible cone faces 22a—23a. However, the driving belt 15 is incapable of moving since the distance between the intermediate pulley axis and the driving pulley axis is fixed for any given adjustment of the screw. The net result must accordingly be an increase in the tension of the driving belt 16 without altering its contacting radius with the expansible pulley. Conversely, a decrease in the load would produce a reverse action to decrease the belt tensions. It will accordingly be seen that by mounting the intermediate pulley device 20 in the manner described, not only has a simple and compact arrangement of parts been provided for effecting changes in the transmission ratio, but an automatic belt tension controller produced which tensions the belts to the required degree, preventing their under or over tensioning accompanied by slipping or stretching, which shortens the extent of use of the pulleys and belts.

It is preferred to secure the driving pulley 12 to the driving shaft 10 adjacent the end bearing of the latter, or adjacent the electric motor 11, as disclosed in the drawing, rather than pivoting the carrier adjacent the motor with the driving pulley on the other side of the carrier and spaced a material distance from the motor bearing. The first-mentioned arrangement decreases the lever arm between the motor bearing and the point at which the pulley is affixed to the shaft, thereby decreasing the bending moment on this shaft and adding to the life of its bearings and the smoothness of operation of its associated elements.

I claim:

1. A variable speed device including a pulley, an expansible pulley, a belt engaging said pulleys, and means for varying the distance between said pulleys comprising a carrier pivoted about the axis of one of said pulleys and supporting the other of said pulleys.

2. A variable speed device including a shaft having a pulley secured thereto, an expansible pulley, a belt engaging said pulleys, a carrier pivoted on said shaft for rotatably supporting said expansible pulley, and means on said carrier for varying the distance between said pulleys whereby to vary the effective diameter of said expansible pulley.

3. A variable speed device including a shaft having a pulley secured thereto, an expansible pulley, a belt engaging said pulleys, a carrier pivoted on said shaft rotatably supporting said expansible pulley, said carrier comprising telescoping parts, and means on one of said parts engageable with said other part for varying the distance between said pulleys whereby to vary the effective diameter of said expansible pulley.

4. A variable speed device as defined in claim 3, said means comprising an adjusting screw rotatably mounted in one of said parts, and a companion threaded member in said other part for receiving said adjusting screw.

5. A variable speed device including a driving shaft, a driven shaft, driving and driven pulleys secured respectively to said shafts, an intermediate pulley device comprising outer sections secured together and a median section movable axially to and from said other sections, a driving belt engaging said driving pulley and a pulley formed by said median section and one of said outer sections, a driven belt engaging said driven pulley and a pulley formed by said median section and the other of said outer sections, and means floatingly mounting said intermediate pulley device to produce automatic adjustment in the tensions of said belts, said means comprising a carrier pivotally mounted on one of said shafts.

6. A variable speed device including a driving shaft, a driven shaft, driving and driven pulleys secured respectively to said shafts, an intermediate pulley device comprising outer sections secured together and a median section movable axially to and from said other sections, a driving belt engaging said driving pulley and a pulley formed by said median section and one of said outer sections, a driven belt engaging said driven pulley and a pulley formed by said median section and the other of said outer sections, and means floatingly mounting said intermediate pulley device to produce automatic adjustment in the tensions of said belts, said means comprising a carrier pivotally mounted on one of said shafts, and instrumentalities carried by said carrier for altering the distances between the axis of said intermediate pulley device and at least one of said other shafts, whereby to alter the transmission ratio.

7. A variable speed device including a driving shaft, a driven shaft, driving and driven pulleys secured respectively to said shafts, an intermediate pulley device comprising outer sections secured together, an inner section between said outer sections and slideable axially with respect thereto, means positively interconnecting said inner section and outer sections for movement in opposite directions, a driving belt engaging said driving pulley and a pulley formed by said inner section and one of said outer sections, a driven belt engaging said driven pulley and a pulley formed by said inner section and the other of said outer sections, means pivotally mounting said intermediate pulley device on one of said shafts, and adjusting means carried by said mounting means for varying the distances between said intermediate device and said shafts, whereby to vary the transmission ratio.

8. A variable speed device as defined in claim 7, said mounting means comprising telescoping parts, and said adjusting means consisting of a shaft rotatable in one of said parts and threadedly received in another of said parts.

9. A variable speed device including a shaft extending from a bearing support and having a pulley secured thereto adjacent said support, an expansible pulley, a belt engaging said pulleys, a carrier rotatably supporting said expansible pulley and pivoted on said shaft adjacent its associated pulley on the other side thereof from said bearing support, and means on said carrier for varying the distance between said pulleys whereby to vary the effective diameter of said expansible pulley.

JOHN H. THOMPSON.